United States Patent
Li et al.

(10) Patent No.: US 12,146,105 B1
(45) Date of Patent: Nov. 19, 2024

(54) IN SITU POLYMER PROPPANT PARTICULATES AND METHODS FOR USE THEREOF

(71) Applicants: SAUDI ARABIAN OIL COMPANY, Dhahran (SA); ALFAISAL UNIVERSITY, Riyadh (SA)

(72) Inventors: Wengang Li, Dhahran (SA); Bader G. Alharbi, Dhahran (SA); Edreese Alshaerah, Riyadh (SA); Mohan Raj Krishnan, Riyadh (SA)

(73) Assignees: SAUDI ARABIAN OIL COMPANY, Dhahran (SA); ALFAISAL UNIVERSITY, Riyadh (SA)

( * ) Notice: Subject to any disclaimer, the term of this patent is extended or adjusted under 35 U.S.C. 154(b) by 0 days.

(21) Appl. No.: 18/346,449

(22) Filed: Jul. 3, 2023

(51) Int. Cl.
| | |
|---|---|
| *E21B 43/267* | (2006.01) |
| *C09K 8/60* | (2006.01) |
| *C09K 8/66* | (2006.01) |
| *C09K 8/68* | (2006.01) |
| *C09K 8/80* | (2006.01) |

(52) U.S. Cl.
CPC ............ *C09K 8/80* (2013.01); *C09K 8/602* (2013.01); *C09K 8/665* (2013.01); *C09K 8/68* (2013.01); *E21B 43/267* (2013.01); *C09K 2208/10* (2013.01)

(58) Field of Classification Search
CPC ....... E21B 43/267; C09K 8/602; C09K 8/665; C09K 8/68; C09K 8/80; C09K 2208/10
See application file for complete search history.

(56) References Cited

U.S. PATENT DOCUMENTS

| | | | |
|---|---|---|---|
| 10,876,044 B2 | 12/2020 | Salla et al. | |
| 2014/0034309 A1* | 2/2014 | Saini | E21B 43/267 |
| | | | 166/177.5 |
| 2018/0298271 A1* | 10/2018 | Auzerais | C09K 8/703 |
| 2021/0062076 A1* | 3/2021 | Li | C09D 163/00 |

OTHER PUBLICATIONS

Chang, Frank F., Berger, Paul D., and Christie H. Lee. "In-Situ Formation of Proppant and Highly Permeable Blocks for Hydraulic Fracturing." Paper presented at the SPE Hydraulic Fracturing Technology Conference, The Woodlands, Texas, USA, Feb. 2015.

(Continued)

*Primary Examiner* — Matthew R Buck
(74) *Attorney, Agent, or Firm* — Vorys, Sater, Seymour and Pease LLP

(57) ABSTRACT

Methods and fracturing fluids for fracturing a subterranean formation using in situ proppant particulates. Methods include introducing a fracturing fluid into a subterranean formation at or above a fracture gradient. The fracturing fluid includes a non-phase-transition fluid comprising at least an aqueous fluid and a surfactant; and a phase-transition fluid comprising a phase-change material selected from the group consisting of styrene monomers, methyl methacrylate monomers, or a combination of styrene monomers and methyl methacrylate monomers, an initiator, and an optional accelerator.

19 Claims, 5 Drawing Sheets

(56) References Cited

OTHER PUBLICATIONS

Tong, Songyang, Miller, Chammi, and Kishore Mohanty. "Generation of In-Situ Proppant through Hydro-Thermal Reactions." Paper presented at the SPE Hydraulic Fracturing Technology Conference and Exhibition, The Woodlands, Texas, USA, Feb. 2019.
Huang, Jiangshui, Gong, Wei, Lin, Lijun, Yin, Congbin, Liu, Fuchen, Zhou, Han, Bai, Litao, Song, Lulu, and Zhengzhou Yang. "In-situ Proppant: Beads, Microproppant, and Channelized-Proppant." Paper presented at the Abu Dhabi International Petroleum Exhibition & Conference, Abu Dhabi, UAE, Nov. 2019.

* cited by examiner

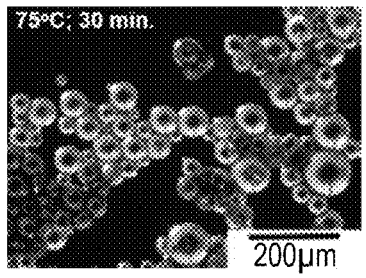 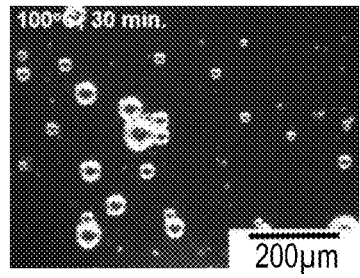 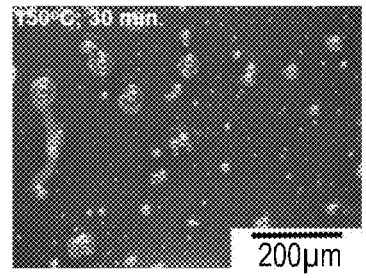
FIG. 7A  FIG. 7B  FIG. 7C
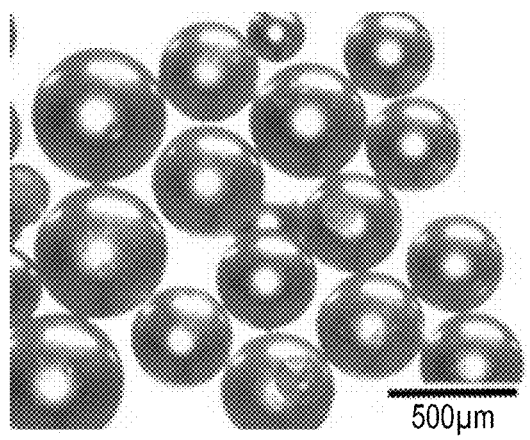 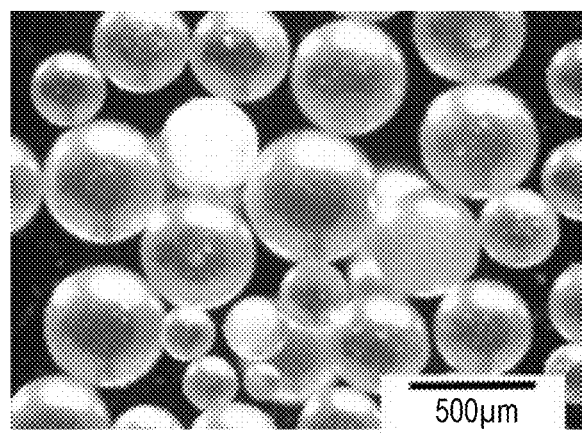
FIG. 8A  FIG. 8B

IN SITU POLYMER PROPPANT PARTICULATES AND METHODS FOR USE THEREOF

FIELD OF THE DISCLOSURE

The present disclosure relates generally to subterranean stimulation operations and, more particularly, to forming in situ polymer proppant particulates within a subterranean formation.

BACKGROUND OF THE DISCLOSURE

Hydrocarbon-producing wells (e.g., oil-producing wells, gas-producing wells, and the like) are often stimulated using hydraulic fracturing treatments. In traditional hydraulic fracturing treatments, a fracturing fluid containing proppant particulates entrained therein is pumped into a portion of a subterranean formation above a fracture gradient pressure sufficient to expand the formation matrix and create one or more fractures therein. The fractures increase the permeability of the formation matrix and allow the production of hydrocarbons to take place more easily.

During fracturing operations, the proppant particulates may enter the fractures while the fractures remain open under high hydraulic pressures. Once the hydraulic pressure is released, the proppant particulates prevent the fractures from fully closing, thereby allowing the increased formation matrix permeability to be at least partially maintained. By keeping the fractures from fully closing, the proppant particulates within the fractures form a proppant pack having interstitial spaces that provide a conductive path through which fluids produced from the formation may flow.

Among numerous factors, the success of a fracturing treatment relies on the proper placement of the proppant particulates within a plurality of fractures to form a suitable proppant pack. Typically, a high viscosity fluid is required to transport the proppant particulates; however, such high viscosity fluids cause considerable friction during pumping and formation damage can occur. Further, leak-off of the fracturing fluid and proppant particulate settling can cause early screen-out and result in a less effective propped area thus reducing the width of fractures and risking fracture closure.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method is provided comprising: providing a fracturing fluid comprising: a non-phase-transition fluid comprising at least an aqueous fluid and a surfactant; a phase-transition fluid comprising: a phase-change material selected from the group consisting of styrene monomers, methyl methacrylate monomers, or a combination of styrene monomers and methyl methacrylate monomers; and an initiator; introducing the fracturing fluid into a subterranean formation at or above a fracture gradient pressure to form a plurality of fractures therein; reacting the surfactant, phase-change material, and the initiator within the subterranean formation, thereby forming a plurality of in situ proppant particulates, wherein heat naturally provided within subterranean formation causes the reacting; and allowing at least a portion of the plurality of in situ proppant particulates to settle in the plurality of fractures.

In another embodiment, a method is provided comprising: providing a fracturing fluid comprising: a non-phase-transition fluid comprising at least an aqueous fluid and a surfactant; and a phase-transition fluid comprising: a phase-change material selected from the group consisting of styrene monomers, methyl methacrylate monomers, or a combination of styrene monomers and methyl methacrylate monomers; an initiator; and an accelerator; introducing the fracturing fluid into a subterranean formation at or above a fracture gradient pressure to form a plurality of fractures therein; reacting the surfactant, phase-change material, the initiator, and the accelerator within the subterranean formation, thereby forming a plurality of in situ proppant particulates; and allowing at least a portion of the plurality of in situ proppant particulates to settle in the plurality of fractures.

In a further embodiment, a fracturing fluid is provided comprising: a non-phase-transition fluid comprising at least an aqueous fluid and a surfactant, wherein the surfactant is present in the non-phase-transition fluid in an amount of from 0.1 wt % to 0.5 wt % of the phase-transition fluid; and a phase-transition fluid comprising: phase-change material selected from styrene monomers, methyl methacrylate monomers, or a combination of styrene monomers and methyl methacrylate monomers, the phase-change material present in the phase-transition fluid in an amount of from 10 wt % to 40 wt % of the phase-transition fluid; an initiator present in the phase-transition fluid in an amount of from 0.01 wt % to 1 wt % of the phase-transition fluid; and an optional accelerator present in the phase-transition fluid in an amount of from 0.01 wt % to 1 wt % of the phase-transition fluid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIGS. 7A-7C provide optical images of in situ proppant particulates prepared according to one or more aspects of the present disclosure in the presence of crude oil.

FIGS. 8A-8B provide optical images showing in situ proppant particulates prepared according to one or more aspects of the present disclosure.

DETAILED DESCRIPTION

Figure 1:
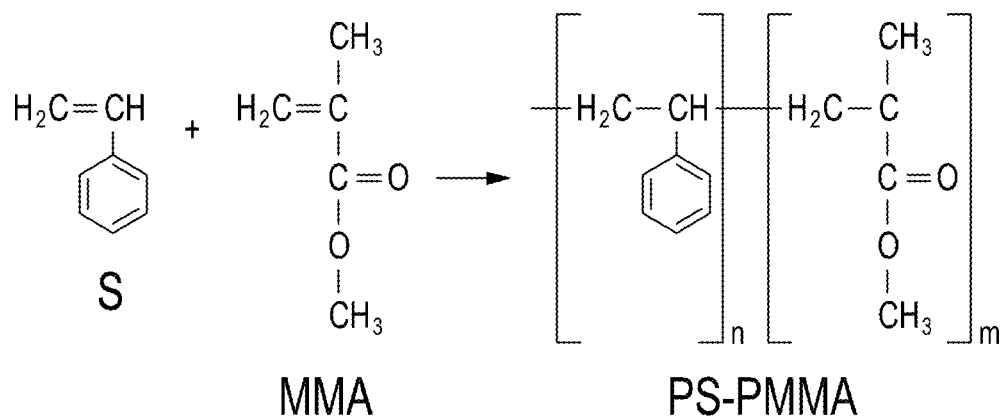
FIG. 1 shows an emulsion polymerization reaction of styrene monomers and methyl methacrylate monomers, according to one or more aspects of the present disclosure.

Embodiments in accordance with the present disclosure generally relate to subterranean stimulation operations and, more particularly, to forming in situ polymer proppant particulates within a subterranean formation.

The present disclosure addresses various deficiencies of currently available hydraulic fracturing proppant particulates. In particular, the present disclosure overcomes the foregoing deficiencies by forming proppant particulates in situ within a wellbore. Advantageously, the fracturing fluid described herein is self-propping and comprises no solid proppant particulates. Instead, the fracturing fluid comprises two fluid types: a phase-transition fluid that converts to solids through phase change at high temperature (or in the presence of an accelerator or both) to support fractures open, and a non-phase-transition fluid that has no phase change and remains a liquid fluid during a fracturing operation. The two fluid types have similar density and are insoluble in each other, thereby resulting in separate flow within fractures. At the target reservoir, the phase-transition fluid type transforms into solid proppant particulates for propping fractures and the non-phase-transition fluid is able to flow back to the surface.

The in situ proppant particulate fracturing fluids form the in situ proppant particulates by emulsion polymerization and advantageously can be prepared as a single aqueous solution (one-pot) that eliminates the need for hazardous organic solvents. Additionally, the mechanical and thermal properties of the in situ proppant particulates can be influenced using 2D-nanomaterials, such as graphene (e.g., commercial graphene (CG)), for fracturing operations in conventional and unconventional subterranean formations.

The in situ proppant particulate fracturing fluids described herein may be particularly advantageous in hydraulic fracturing operations due to the low density and weight of the fluid. Conventional proppant particulates commonly comprise dense solids such as quartz sand, fragments of nut shells, ceramics, and the like. These conventional proppant particulates must often be suspended in highly viscous carrier fluids to form a homogenous mixture that is conveyed into a subterranean formation. Resultantly, the mixture of viscous carrier fluid and conventional proppant particulates is injected into a hydrocarbon-producing well at a significantly high pressure. The in situ proppant particulate fracturing fluids of the present disclosure, however, do not require viscous carrier fluids because they are not conveying solid proppant particulates, thus allowing for lower injection pressures.

The in situ proppant particulate fracturing fluids comprise an aqueous non-phase-transition fluid and a phase-transition fluid. The ratio of the non-phase-transition fluid to the phase-transition fluid may be in a ratio of about 40 wt %:60 wt % to about 90 wt %:10 wt %, encompassing any value and subset therebetween.

The non-phase-transition fluid comprises an aqueous fluid. Suitable aqueous fluids may include, but are not limited to, fresh water, slick water, seawater, brine, produced water, or any combination thereof. The non-phase-transition fluid may further comprise a surfactant.

The surfactant can aid in stabilizing and dispersing inorganic and organic substances. Suitable surfactants may include, but are not limited to, anionic surfactants or non-ionic surfactants. Anionic surfactants may include, but are not limited to, alkyl sulfate surfactants, alkyl sulfonate surfactants, or alkylbenzene sulfonate surfactants; the non-ionic surfactant may include, but is not limited to, polyether surfactants; still further, the polyether surfactants may be selected from polyoxyethylene ether surfactants; in particular, it may be an octylphenol polyoxyethylene ether and/or a nonylphenol polyoxyethylene ether, and the like, and any combination thereof. In a preferred embodiment, the surfactant is sodium dodecyl sulfonate. The surfactant may be included in the non-phase-transition fluid in an amount in the range of about 0.1 wt % to about 0.5 wt %, encompassing any value and subset therebetween, such as about 0.1 wt % to 0.25 wt %, or 0.25 wt % to 0.5 wt %, or 0.3 wt % to 0.4 wt % by total weight of the non-phase-transition fluid.

The in situ proppant particulate fracturing fluids additionally comprise a phase-transition fluid comprising a phase-change material, homopolymer or copolymer, capable of converting from a liquid to a solid under emulsion polymerization conditions, thereby forming the in situ proppant particulates of the present disclosure. In one or more instances, the phase-change material may be styrene monomers, methyl methacrylate monomers, or a combination thereof. Such monomers undergo emulsion polymerization into a polystyrene homopolymer (PS), a polymethyl methacrylate homopolymer (PMMA), a polystyrene-polymethyl methacrylate copolymer (PS-PMMA), and any combination thereof. The phase-change material may be present in a range of about 10 percent by weight (wt %) to about 40 wt % of the total phase-transition fluid, encompassing any value and subset therebetween, such as about 10 wt % to about 20 wt %, or about 20 wt % to about 40 wt %, or about 40 wt % to about 50 wt %, or about 25 wt % to about 35 wt %. Moreover, where the PS-PMMA copolymer proppant particulates are desired, styrene monomers and methyl methacrylate monomers may be provided for emulsion polymerization in a ratio of about 0.1 wt %:99.9 wt % to about 99.9 wt %:0.1 wt %, encompassing any value and subset therebetween. In preferred embodiments, where the PS-PMMA copolymer proppant particulates are desired, styrene monomers and methyl methacrylate monomers may be provided for emulsion polymerization in a ratio of about 1:1.

Although the present disclosure is described with reference to PS homopolymers, PMMA homopolymers, and PS-PMMA copolymers, it is to be appreciated that other monomers may be reacted to form suitable homopolymers and copolymers for use in forming the in situ proppant particulates of the present disclosure. Such polymers may include polydivinyl benzene (PDVB), polystyrene-polydivinyl benzene (PS-PDVB), polymethyl methacrylate-polydivinyl benzene (PMMA-PDVB), and the like.

The phase-transition fluid of the in situ proppant particulate fracturing fluids of the present disclosure may further comprise an aqueous fluid, including any mentioned hereinabove, an initiator, an accelerator (also referred to as a catalyst), a 2D-nanomaterial filler, and any combination thereof. The phase-change material may be provided in the phase-transition fluid by reacting a surfactant (from the non-phase-transition fluid) and monomers. Emulsion polymerization may be provided in the phase-transition fluid by the presence of the initiator.

The initiator serves to initiate polymerization, and an appropriate initiator can be selected depending on the chosen phase-change material. Initiators may include, but are not limited to, peroxides. The peroxide initiators may include, but are not limited to diacyl peroxides, such as benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; ketone peroxides, such as acetylacetone peroxide, methylethylketone peroxide, cyclohexanone peroxide and methylisobutylketone peroxide; the peresters, such as tert-butyl peroxide-2-ethyl hexanoate; the perketals, such as 1,1-ditert-butylperoxy-3,3,5-trimethyl cyclohexane and dialkyl peroxides, such as 1,3-bis(tert-butylperoxyisopropyl) benzene; hydrogen peroxide; and the like, and any combination thereof. Diacyl peroxides, and particularly benzoyl peroxide (BPO), are the preferred initiators. The initiator may be included in the phase-transition fluid in an amount in the range of about 0.01 wt % to about 1 wt %, encompassing any value and subset therebetween, such as about 0.01 wt % to about 0.1 wt %, 0.1 wt % to 0.5 wt %, or 0.5 wt % to 1 wt %, or 0.3 wt % to 0.8 wt % by total weight of the phase-transition fluid.

The accelerator serves to hasten the emulsion polymerization reaction and can cleave the peroxy linkages of the initiator and form initiator radicals. Generally, the accelerator is added if the particular subterranean formation is not of sufficient temperature to initiate polymerization; the accelerator may aid in the radical formation of initiator at temperatures from equal to or greater than about 20° C. Suitable accelerators include, but are not limited to, tertiary amines, such as dimethyl-p-toluidine (DMPT), N,N-dimethylaniline (DMA), N,N-diethylaniline (DEA), N,N-bis-(2-hydroxyethyl)-m-toluidine, N,N-bis-(2-hydroxyethyl)-p-toluidine (HEPT), and any combination thereof. In preferred embodiments, the accelerator is DMPT. The accelerator may be included in the phase-transition fluid in an amount in the range of about 0.01 wt % to about 1 wt %, encompassing any value and subset therebetween, such as about 0.01 wt % to about 0.1 wt %, 0.1 wt % to 0.5 wt %, or 0.5 wt % to 1 wt %, or 0.3 wt % to 0.8 wt % by total weight of the phase-transition fluid.

A 2D-nanomaterial may further be included in the phase-transition fluid to optimize the mechanical and thermal properties of the resultant in situ proppant particulates for fracturing operations in both conventional and unconventional subterranean formations. 2D-nanomaterials are composed of thin layers that may have a thickness of at least one atomic layer and may include, but are not limited to, graphene and derivatives thereof (e.g., graphene oxide, reduced graphene oxide, graphitic carbon nitride), silicate clays, layered double hydroxides, transition metal dichalcogenides, transition metal oxides, black phosphorus, hexagonal boron nitride, antimonene, boron nanosheets, hexagonal boron nitride nanosheets, tin telluride nanosheets, and the like, and any combination thereof. In preferred embodiments, the 2D-nanomaterial may be graphene and/or hexagonal boron nitride nanosheets. When included, the 2D-nanomatial may be included in the phase-transition fluid in an amount in the range of about 0.01 wt % to about 1 wt %, encompassing any value and subset therebetween, such as about 0.01 wt % to about 0.1 wt %, 0.1 wt % to 0.5 wt %, or 0.5 wt % to 1 wt %, or 0.3 wt % to 0.8 wt % by total weight of the phase-transition fluid.

As provided above, the in situ proppant particulate fracturing fluid of the present disclosure, comprising simultaneously a non-phase-transition fluid and a phase-transition fluid, form in situ proppant particulates by emulsion polymerization. Emulsion polymerization is a type of free-radical polymerization in which monomers are polymerized in an aqueous solution. Emulsion polymerization generally includes initial dissolution of surfactant molecules in an aqueous fluid (e.g., water), thereby forming micelles. Monomer molecules are added and absorbed by the micelles, thereby forming monomer droplets. An initiator is included and typically present in the aqueous phase. Under heating conditions or in the presence of an accelerator (e.g., DMPT), peroxy linkages of the initiator (e.g., BPO) are cleaved and form initiator radicals that react with the monomer droplets to initiate polymerization.

FIG. 1 shows an emulsion polymerization reaction of styrene monomers, S, and methyl methacrylate monomers (MMA). In the presence of at least water, surfactant, initiator, and heat, represented as the right-facing arrow, polymerization occurs to form polystyrene-polymethyl methacrylate copolymer (PS-PMMA). Alternatively, if the temperature is not sufficient to initiate polymerization, again represented as the right-facing arrow, polymerization can occur in the presence of at least water, surfactant, initiator, and accelerator to form the PS-PMMA copolymer. As described above, the emulsion copolymerization may also occur in the presence (i.e., included in the phase-transition fluid) of a 2D nanomaterial.

The in situ proppant particulates of the present disclosure may be of any size and shape combination suitable for use in a hydraulic fracturing operation.

Generally, the in situ proppant particulates described herein have an average particle diameter size in the range of about 50 μm to about 1.000 μm, encompassing any value and subset therebetween, such as about 100 μm to about 600 μm, or about 300 μm to about 800 μm, or about 500 μm to about 700 μm.

The Krumbein Chart provides an analytical tool to standardize visual assessment of the sphericity and roundness of particles, including proppant particulates. Each of sphericity and roundness is visually assessed on a scale of 0 to 1, with higher values of sphericity corresponding to more spherical particles and higher values of roundness corresponding to less angular contours on a particle's surface. According to API RP-19C standards, the shape of a proppant particulate is considered adequate for use in hydraulic fracturing operations if the Krumbein value for both sphericity and roundness is ≥0.6. As provided in the examples below, the shapes of the in situ proppant particulates exhibit a Krumbein value for both sphericity and roundness that is ≥0.6, and generally ≥0.9, and thus are suitable for use as proppant particulates.

Regardless of composition, the in situ proppant particulate composition (e.g., PS, PMMA, PS-PMMA) may be selected to possess both relatively high thermal stability and compressive strength to withstand downhole conditions during a fracturing operation. In non-limiting examples, the in situ proppant particulates may be thermally stable over a temperature in the range of about 20° C. to about 200° C., encompassing any value and subset therebetween, such as about 20° C. to about 125° C., or about 75° C. to about 150° C. In addition or alternately, the in situ proppant particulates may have a compressive strength as determined by API RP-19C, in the range of about 3,000 psi to about 12,000 psi, encompassing any value and subset therebetween, such as about 3,000 psi to about 6.000 psi, or about 5,000 psi to about 10.000 psi, or about 7.500 psi to about 12,000 psi.

The present disclosure provides fracturing methods in which the in situ proppant particulate fracturing fluids of the present disclosure are introduced to a subterranean formation wellbore, where the in situ proppant particulates are formed and settle within and prop a plurality of fractures and keep them from closing or fully closing upon hydraulic pressure removal.

Figure 2:
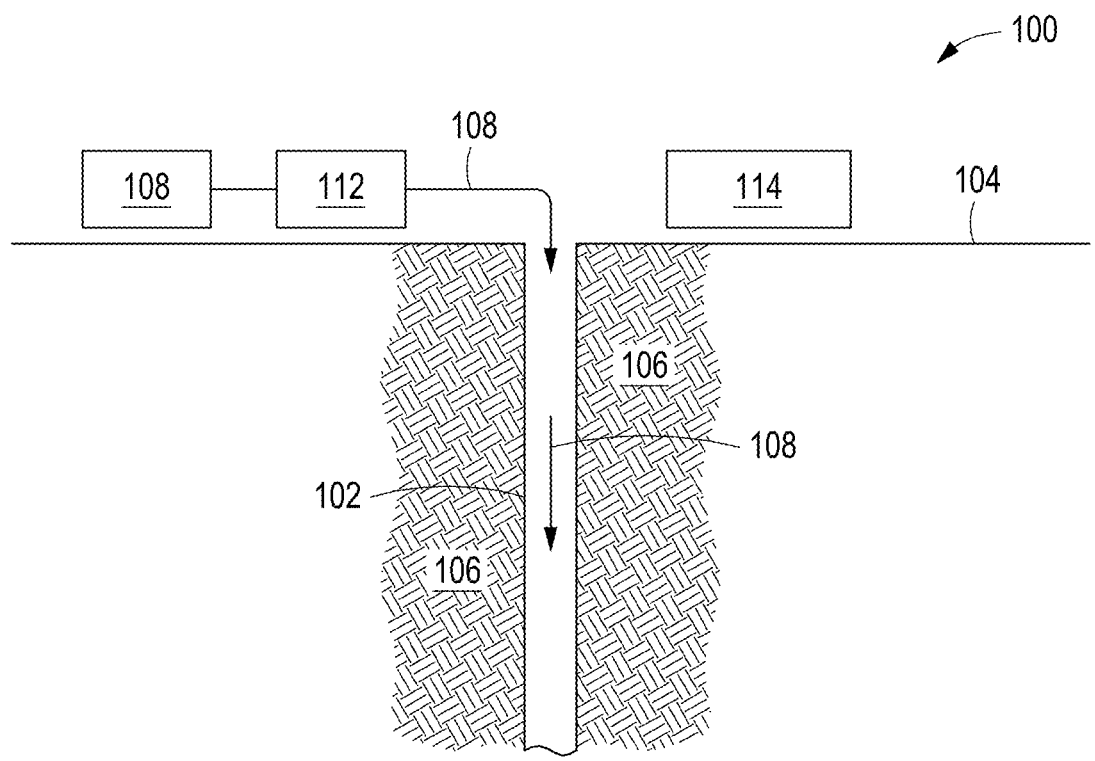
FIG. 2 is a diagram of a well site having a hydraulic fracturing system for use according to one or more aspects of the present disclosure.

FIG. 2 is a non-limiting example of well site 100 having wellbore 102 formed through the Earth's surface 104 into subterranean formation 106 in the Earth's crust. Wellbore 102 may be vertical, horizontal, or deviated, without departing from the scope of the present disclosure. Wellbore 102 may be openhole, but may generally be a cased wellbore. The annulus between the casing and formation 106 may be cemented. Perforations may be formed through the casing and the cement into the formation 106. The perforations may allow for the flow of the in situ proppant particulate fracturing fluid into subterranean formation 106 and for the flow of produced hydrocarbon from subterranean formation 106 into wellbore 102.

Well site 100 may have a hydraulic fracturing system including a source of in situ proppant particulate fracturing fluid 108 at the Earth's surface 104 near or adjacent to the wellbore 102. The in situ proppant particulate fracturing fluid 108 source may include one or more vessels holding the in situ proppant particulate fracturing fluid 108. In situ proppant particulate fracturing fluid 108 may be stored in vessels or containers on the ground or on a vehicle such as a truck. In situ proppant particulate fracturing fluid 108 may comprise the two phase fluids described hereinabove, namely the non-phase-transition fluid and the phase-transition fluid, which may be delivered simultaneously.

The hydraulic fracturing system at well site 100 may include motive devices, such as one or more pumps 112 to pump or inject the in situ proppant particulate fracturing fluid 108 through wellbore 102 into subterranean formation 106. The one or more pumps 112 may, for example, be positive displacement pumps arranged in series or in parallel. In some embodiments, the speed of the one or more pumps 112 may be controlled to give a desired flow rate of in situ proppant particulate fracturing fluid 108. The system may include a control component to modulate or maintain the flow of in situ proppant particulate fracturing fluid 108 into wellbore 102 for hydraulic fracturing. The control component may, for example, be one or more control valves. In some implementations, the control component may integrated into the one or more pumps 112 as a metering pump in which the speed of the pump is controlled to give the specified flow rate of in situ proppant particulate fracturing fluid 108. The set point of the control component may be manually set or driven by an automatic (e.g., electronic) control system.

In situ proppant particulate fracturing fluid 108 comprises a phase-transition fluid capable of forming in situ proppant particulates within the wellbore 102 and settling into the fractures formed as part of the fracturing operation.

The final concentration of the plurality of in situ proppant particulates formed within the in situ proppant particulate fracturing fluid 108 may, for example, be in the range of about 0.1 wt % to about 10 wt %, encompassing any value and subset therebetween, or about 0.1 wt % to about 5 wt %, or about 0.1 wt % to about 3 wt %, or about 0.1 wt % to about 1 wt %, or about 1 wt % to about 10 wt %, or about 1 wt % to about 5 wt %, or about 1 wt % to about 3 wt %, or about 3 wt % to about 10 wt %, or about 3 wt % to about 5 wt %, or about 5 wt % to about 10 wt %.

Surface equipment 114 at well site 100 may include equipment to drill a borehole to form wellbore 102. Surface equipment 114 may include a mounted drilling rig which may be a machine that creates boreholes in the Earth's subsurface. To form a hole in the ground, a drill string having a drill bit may be lowered into the hole being drilled. In operation, the drill bit may rotate to break the rock formations to form the hole as wellbore 102. In the rotation, the drill bit may interface with the ground or formation 106 to grind, cut, scrape, shear, crush, or fracture rock to drill the hole. Surface equipment 114 may include equipment for installation and cementing of casing in the wellbore 102, as well as for forming perforations through wellbore 102 into subterranean formation 106. Surface equipment 116 may also include equipment to support the hydraulic fracturing.

Figure 3:
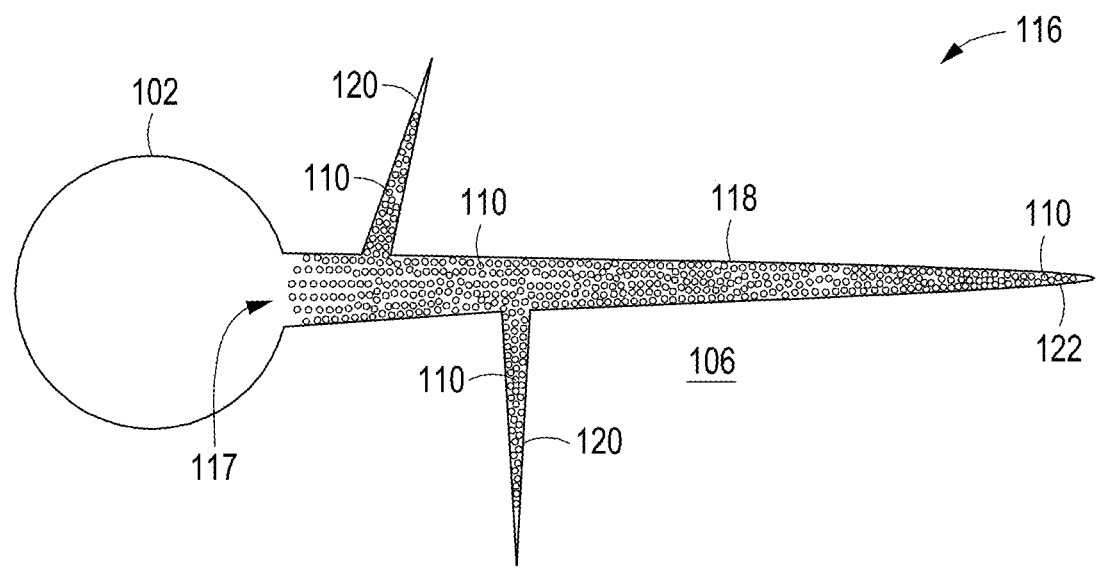
FIG. 3 is a diagram of a fracture containing a plurality of in situ proppant particulates, according to one or more aspects of the present disclosure.
Figures 4A, 4B, 4C, 4D:
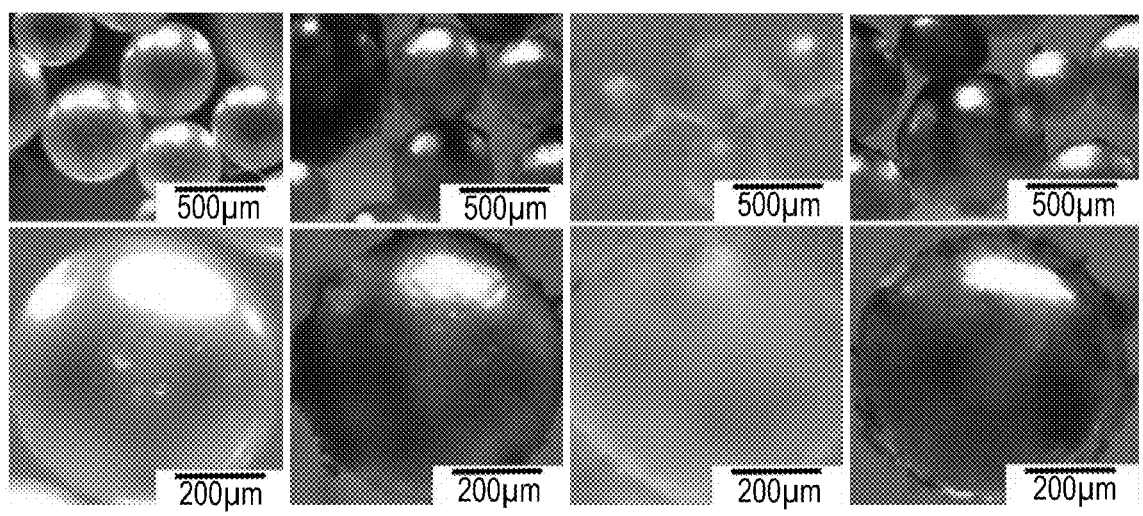
FIGS. 4A-4D provide optical images showing in situ proppant particulates prepared according to one or more aspects of the present disclosure.

FIG. 3 is a non-limiting example of a single hydraulic fracture 116 associated with wellbore 102 of FIG. 2, where like numerical labeling is used when appropriate. Wellbore 102 may contain a plurality of fractures 116. Wellbore 102 is depicted as a circular cross-section in FIG. 3. It should be appreciated that other geometric shapes are possible in some instances. A perforation 117 may be formed through wellbore 102 wall into subterranean formation 106. In the illustrated embodiment, the depicted hydraulic fracture 116 includes primary fracture 118 and secondary fractures 120. Primary fracture 118 and secondary fractures 120 are hydraulically formed by injecting in situ proppant particulate fracturing fluid 108 (FIG. 2) through perforation 117 into subterranean formation 106. Several more fractures 118 and secondary fractures 120 than depicted may be formed by in situ proppant particulate fracturing fluid. The secondary fractures 120 may have a smaller fracture width than primary fracture 118.

In the illustrated embodiment, the phase-transition fluid of the in situ proppant particulate fracturing fluid 108 forms a plurality of in situ proppant particulates 110 within the wellbore 102 and are conveyed into primary fracture 118. The in situ proppant particulates 110 may approach fracture tip 122 of primary fracture 118. The distance that the in situ proppant particulates 110 reach toward fracture tip 122 may depend on the particle size of in situ proppant particulates 110 and whether the in situ proppant particulates 110 form (become solid particles) within the wellbore 102 or within the primary fracture 118. The in situ proppant particulates 110 may be positioned in primary fracture 118 to maintain the opening of primary fracture 118. The in situ proppant particulate fracturing fluid 108 may convey the plurality of in situ proppant particulates 110 into secondary fractures 120 as depicted, depending on the particle size of in situ proppant particulates 110, which may be dependent upon the temperature, pressure, and orientation of the wellbore 102, and the fracture width of secondary fractures 120. In situ proppant particulates 110, if present in secondary fractures 120, may maintain the opening of secondary fractures 120.

Embodiments disclosed herein include:

Embodiment A. A method comprising: providing a fracturing fluid comprising: a non-phase-transition fluid comprising at least an aqueous fluid and a surfactant; a phase-transition fluid comprising: a phase-change material selected from the group consisting of styrene monomers, methyl methacrylate monomers, or a combination of styrene monomers and methyl methacrylate monomers; and an initiator; introducing the fracturing fluid into a subterranean formation at or above a fracture gradient pressure to form a plurality of fractures therein; reacting the surfactant, phase-change material, and the initiator within the subterranean formation, thereby forming a plurality of in situ proppant particulates, wherein heat naturally provided within subterranean formation causes the reacting; and allowing at least a portion of the plurality of in situ proppant particulates to settle in the plurality of fractures.

Embodiment B. A method comprising: providing a fracturing fluid comprising: a non-phase-transition fluid comprising at least an aqueous fluid and a surfactant; and a phase-transition fluid comprising: a phase-change material selected from the group consisting of styrene monomers, methyl methacrylate monomers, or a combination of styrene monomers and methyl methacrylate monomers; an initiator, and an accelerator; introducing the fracturing fluid into a subterranean formation at or above a fracture gradient pressure to form a plurality of fractures therein; reacting the surfactant, phase-change material, the initiator, and the accelerator within the subterranean formation, thereby forming a plurality of in situ proppant particulates; and allowing at least a portion of the plurality of in situ proppant particulates to settle in the plurality of fractures.

Embodiment C. A fracturing fluid comprising: a non-phase-transition fluid comprising at least an aqueous fluid and a surfactant, wherein the surfactant is present in the non-phase-transition fluid in an amount of from 0.1 wt % to 0.5 wt % of the phase-transition fluid; and a phase-transition fluid comprising: phase-change material selected from styrene monomers, methyl methacrylate monomers, or a combination of styrene monomers and methyl methacrylate monomers, the phase-change material present in the phase-transition fluid in an amount of from 10 wt % to 40 wt % of the phase-transition fluid; an initiator present in the phase-transition fluid in an amount of from 0.01 wt % to 1 wt % of the phase-transition fluid; and an optional accelerator present in the phase-transition fluid in an amount of from 0.01 wt % to 1 wt % of the phase-transition fluid.

Each of embodiments A, B, and C may have one or more of the following additional elements in any combination:

Element 1: wherein the phase-change material is present in the phase-transition fluid in an amount of from 10 wt % to 40 wt % of the phase-transition fluid.

Element 2: wherein the surfactant is selected from the group consisting of an alkyl sulfate surfactant, an alkyl sulfonate surfactant, an alkylbenzene sulfonate surfactant, a polyether surfactant, and any combination thereof.

Element 3: wherein the surfactant is present in the non-phase-transition fluid in an amount of from 0.1 wt % to 0.5 wt % of the non-phase-transition fluid.

Element 4: wherein the initiator is selected from the group consisting of a diacyl peroxide, a ketone peroxide, a perester, a perketal, hydrogen peroxide, and any combination thereof.

Element 5: wherein the initiator is present in the phase-transition fluid in an amount of from 0.01 wt % to 1 wt % of the phase-transition fluid.

Element 6: wherein the phase-transition fluid further comprises a 2D-nanomaterial selected from the group consisting of graphene, graphene derivatives thereof, silicate clays, layered double hydroxides, transition metal dichalcogenides, transition metal oxides, black phosphorus, hexagonal boron nitride, antimonene, boron nanosheets, hexagonal boron nitride nanosheets, tin telluride nanosheets, and any combination thereof.

Element 7: wherein the phase-transition fluid further comprises a 2D-nanomaterial present in the phase-transition fluid in an amount of from 0.01 wt % to 1 wt %.

Element 8: wherein the accelerator is selected from the group consisting of dimethyl-p-toluidine, N,N-dimethylaniline, N,N-diethylaniline, N,N-bis-(2-hydroxyethyl)-m-toluidine, N,N-bis-(2-hydroxyethyl)-p-toluidine, and any combination thereof.

Element 9: wherein the accelerator is present in the phase-transition fluid in an amount of from 0.01 wt % to 1 wt % of the phase-transition fluid.

By way of non-limiting example, exemplary combinations applicable to Embodiment A include any one, more, or all of Elements 1-7, in any combination without limitation.

By way of non-limiting example, exemplary combinations applicable to Embodiment B include any one, more, or all of Elements 1-9, in any combination without limitation.

By way of non-limiting example, exemplary combinations applicable to Embodiment C include any one, more, or all of Elements 2, 4, 6, or 7, in any combination without limitation.

To facilitate a better understanding of the aspects of the present disclosure, the following examples of preferred or representative aspects are given. In no way should the following examples be read to limit, or to define, the scope of the disclosure.

EXAMPLES

EXAMPLE 1: In this Example, a polystyrene-polymethyl methacrylate (PS-PMMA) copolymer was prepared and evaluated visually (optical properties) for size range and distribution, and sphericity/roundness. The particular formulation for each copolymer sample is provided in Table 1 below.

TABLE 1

| Sample ID | PS-PMMA1 | PS-PMMA2 | PS-PMMA-CG1 | PS-PMMA-CG2 | PS-PMMA-BN1 | PS-PMMA-BN2 | PS-PMMA-CG:BN1 | PS-PMMA-CG:BN2 |
|---|---|---|---|---|---|---|---|---|
| $H_2O$ (mL) | 100 | 100 | 100 | 100 | 100 | 100 | 100 | 100 |
| SDS (g) | 0.5 | 0.5 | 0.5 | 0.5 | 0.5 | 0.5 | 0.5 | 0.5 |
| Styrene Monomer (g) | 5 | 5 | 5 | 5 | 5 | 5 | 5 | 5 |
| MMA Monomer (g) | 5 | 5 | 5 | 5 | 5 | 5 | 5 | 5 |
| BN (wt %) | N/A | N/A | N/A | N/A | 0.1 | 0.1 | 0.03 | 0.03 |
| CG (wt %) | N/A | N/A | 0.1 | 0.1 | N/A | N/A | 0.07 | 0.07 |
| BPO (g) | 0.1 | 0.1 | 0.1 | 0.1 | 0.1 | 0.1 | 0.1 | 0.1 |
| DMPT (mL) | 0.25 | 0.25 | 0.25 | 0.25 | 0.25 | 0.25 | 0.25 | 0.25 |

TABLE 1-continued

| Sample ID | PS-PMMA1 | PS-PMMA2 | PS-PMMA-CG1 | PS-PMMA-CG2 | PS-PMMA-BN1 | PS-PMMA-BN2 | PS-PMMA-CG:BN1 | PS-PMMA-CG:BN2 |
|---|---|---|---|---|---|---|---|---|
| Temp (° C.) | 80-90 | 25 | 80-90 | 25 | 80-90 | 25 | 80-90 | 25 |
| Reaction Time (h) | 8 | 0.5-8 | 8 | 0.5-8 | 8 | 0.5-8 | 8 | 0.5-8 |

Each copolymer was prepared by (1) mixing the sodium dodecyl sulfate (SDS) surfactant and deionized (DI) water followed by sonication of the mixture for 20 minutes; (2) mixing the styrene (S) monomers and methyl methacrylate (MMA) monomers (1:1 wt % ratio of the monomers) and the BPO and adding this mixture to the mixture from Step (1), thus forming a Step (2) mixture; and either (3a) heating the Step (2) mixture to 80° C. for 8 hours and 90° C. for an additional 8 hours, both under continuous stirring and $N_2$ gas purging conditions using a condenser set-up or (3b) maintaining the Step (2) mixture at room temperature (RT, ~25° C.) for 0.5 hours to 8 hours (with observation during that time). Thereafter, PS-PMMA particles were obtained and washed with water to remove residual SDS surfactant. Emulsion polymerization was carried out either at room temperature (RT, ~25° C.) by adding DMPT or by applying heat.

In various samples a commercial graphene (CG), hexagonal boron nitride nanosheets (BN), or a combination of both CG and BN were included in Step (2) to adjust mechanical and thermal properties.

FIGS. 4A-4D provide optical images obtained for samples PS-PMMA1 (FIG. 4A), PS-PMMA-CG1 (FIG. 4B), PS-PMMA-BN1 (FIG. 4C), and PS-PMMA-CG:BN1 (FIG. 4D) prepared under hydrothermal conditions at 80-90° C. As shown in FIGS. 4A-4D, the optical images show a 500 μm scale and a 200 μm scale, indicating the diameter size of a portion of the formed in situ proppant particulates. Moreover, the sphericity and roundness was observed to be ≥0.6, and indeed ≥0.9. The greater the sphericity and roundness, the greater the ability to maintain fracture conductivity. It is further noted that the in situ proppant particulates comprising the 2D-nanomaterials generally exhibit greater particle size distribution based on visual observation.

Figures 5A, 5B, 5C:
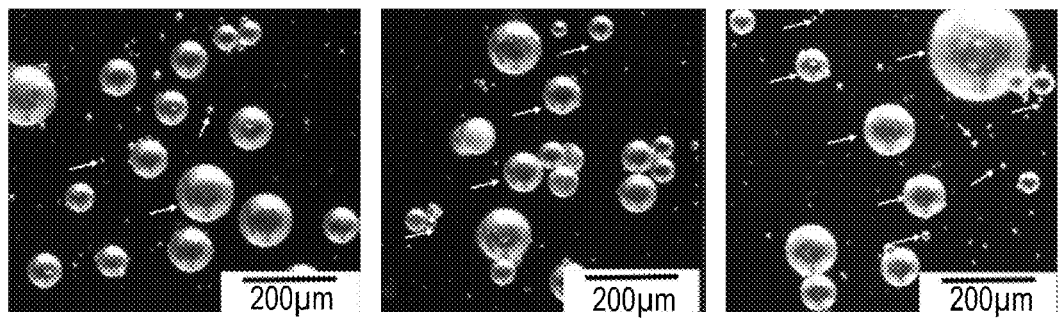
FIGS. 5A-5C provide optical images showing in situ proppant particulates prepared according to one or more aspects of the present disclosure.

FIGS. 5A-5C show optical images of PS-PMMA1 (triplicate images) prepared under hydrothermal conditions at 80-90° C. As shown in FIGS. 5A-5C, the optical images show a 200 μm scale and compared to the in situ proppant particulates of FIGS. 4A-4D (without hydrothermal conditions, but rather ambient conditions), the PS-PMMA1 in situ proppant particulates that were prepared under hydrothermal conditions exhibit a great particle distribution and include much smaller particulates (arrows). Accordingly, under subterranean conditions, it would be expected that the in situ proppant particulates would exhibit a broad particle size distribution for propping fractures of various sizes.

Figure 6:
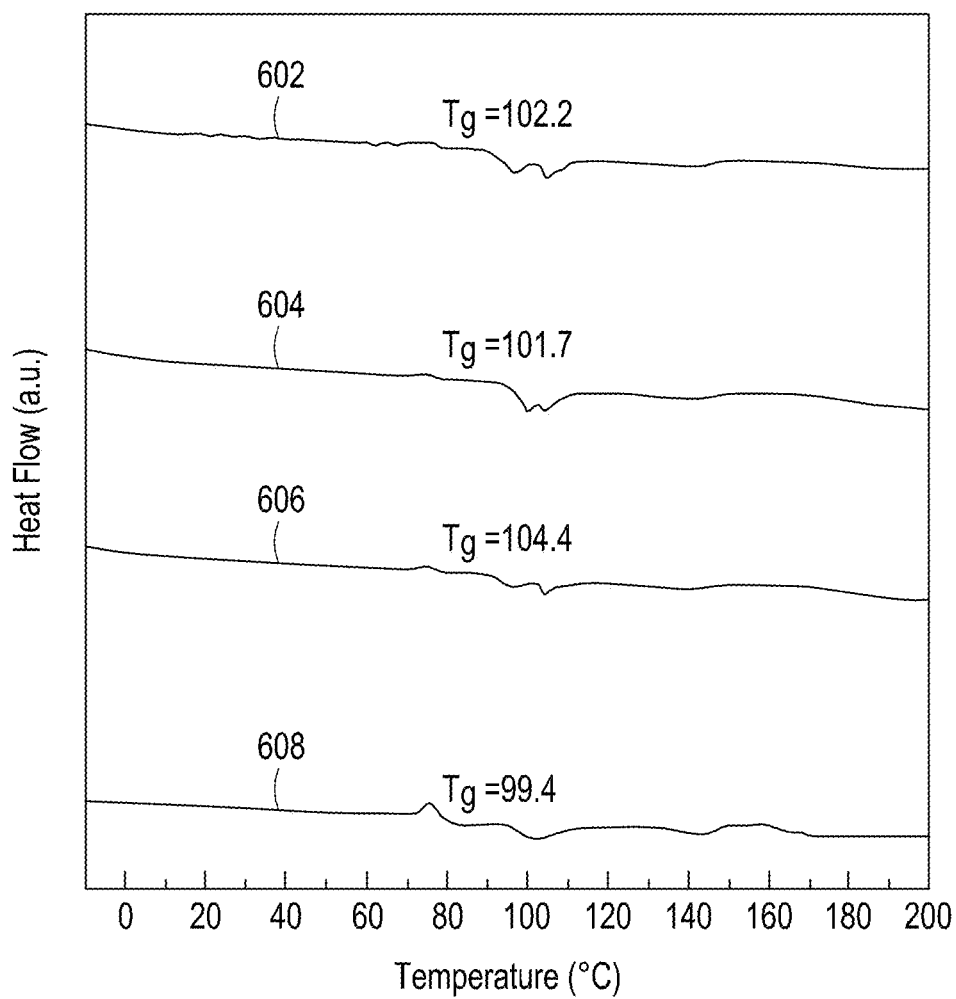
FIG. 6 graphically depicts the relationship between temperature and heat flow of in situ proppant particulates prepared according to embodiments of this disclosure.
Figure 9A:
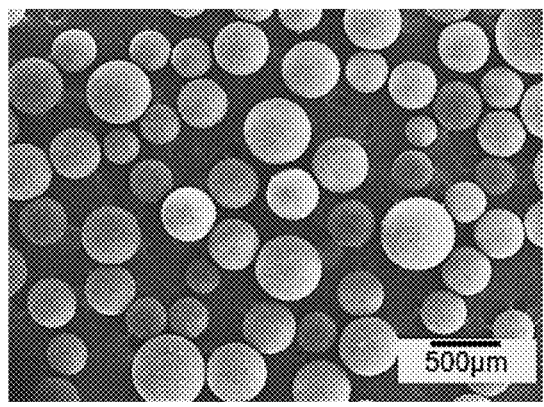
FIGS. 9A-9D provide scanning electron microscopy images showing in situ proppant particulates prepared according to one or more aspects of the present disclosure.
Figure 9B:
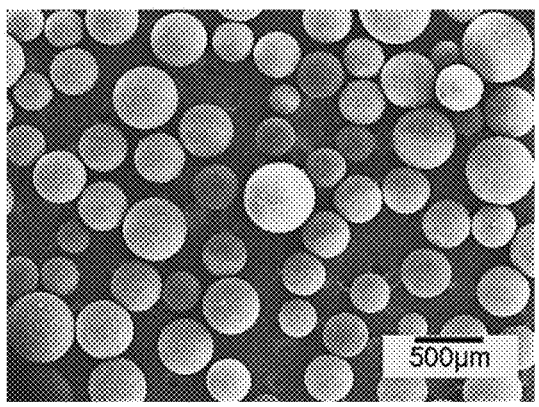
Figure 9C:
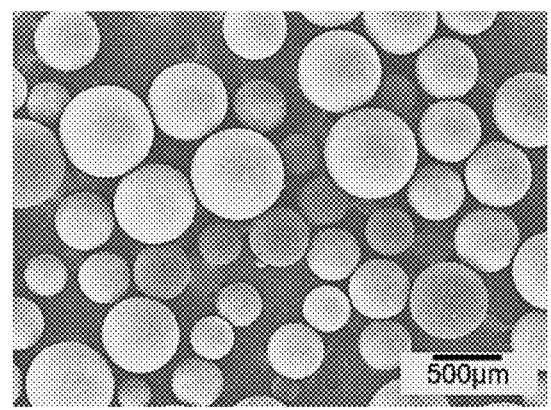
Figure 9D:
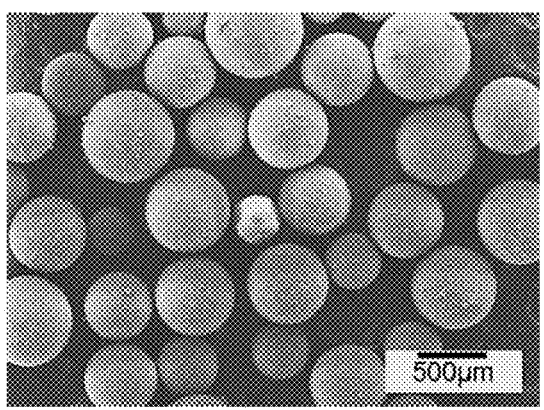

EXAMPLE 2: In this Example, the thermal stability of various samples prepared in Example 1 were evaluated using differential scanning calorimetry (DSC) using a Hitachi, Ltd. DSC7020 (Tokyo, Japan). The results are shown in FIG. 6. The DSC curves in FIG. 6 show the glass transition temperatures ($T_g$) for the respective in situ proppant particulates, particularly for PS-PMMA1 608, PS-PMMA-CG1 606, PS-PMMA-BN1 604, and PS-PMMA-CG:BN1 602 prepared under hydrothermal conditions at 80-90° C. The $T_g$ of a polymer is defined as a temperature below which the polymer is in glassy state and above which it is in rubbery state, thereby providing thermal stability and purity insights, particularly when used in a subterranean formation operation (e.g., fracturing). It is evident from the $T_g$ of the Example 1 samples, as shown in FIG. 6, that the inclusion of the 2D-nanoparticles improved the Tg of the neat PS-PMMA2 608 samples in all instances.

EXAMPLE 3: In this Example, the stability of various PS-PMMA1 samples prepared in Example 1 under hydrothermal conditions at 80-90° C. were evaluated by exposing the PS-PMMA1 to crude oil at 75° C. for 30 min (below its $T_g$ (FIG. 7A)), 100° C. for 30 min (at its $T_g$ (FIG. 7B)), and 150° C. for 30 min (above its $T_g$ (FIG. 7C)). The results are shown in FIGS. 7A-7B. The optical images of FIGS. 7A-7B demonstrate that the PS-PMMA1 in situ proppant particulates are stable in crude oil at and below the $T_g$ value, but dissolve at temperatures that are greater than the $T_g$ value.

EXAMPLE 4: In this Example, polystyrene homopolymer (PS) and polymethyl methacrylate homopolymer (PMMA) in situ proppant particulates were prepared and visually evaluated (optical properties). The PS and PMMA in situ proppant particulates were prepared by mixing 0.05 g of SDS surfactant and 10 mL of DI water followed by sonication of the mixture for 30 minutes; (2) mixing either 1 g of styrene (S) monomers or 1 g of methyl methacrylate (MMA) monomers (1:1 wt % ratio of the monomers) and 0.01 g of BPO and adding this mixture to the mixture from Step (1), thus forming a Step (2) mixture; and either (3a) adding 1 μL of DMPT to the Step (2) mixture and heating at 30° C. for 2-8 hours (observation period, in which the in situ proppant particulates began forming at about 2 hours and continued until about 8 hours) or (3b) omitting DMPT and heating at 80° C. for 2-8 hours (observation period). The optical results are shown in FIG. 8A for PS homopolymer and FIG. 8B for PMMA homopolymer without DMPT. Similar to the PS-PMMA samples discussed above, the PS and PMMA homopolymers show a 500 μm scale, indicating the diameter size of a portion of the formed in situ proppant particulates. Moreover, the sphericity and roundness was observed to be ≥0.6, and indeed ≥0.9.

EXAMPLE 5: With reference again to Example 1, FIGS. 9A-9D show scanning electron microscopic images of hydrothermal heat treated (80° C.-90° C.) samples of PS-PMMA1, PS-PMMA-CG1, PS-PMMA-BN1, and PS-PMMA-CG:BN1, respectively. As shown, the sphericity and roundness was observed to be ≥0.6, and indeed ≥0.9.

Accordingly, the compositions and methods for forming and using the in situ proppant particulates described herein are suitable for fracturing operations in subterranean formations.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," "and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
    providing a fracturing fluid comprising:
        a non-phase-transition fluid comprising at least an aqueous fluid and a surfactant;
        a phase-transition fluid comprising:
            a phase-change material selected from the group consisting of styrene monomers, methyl methacrylate monomers, or a combination of styrene monomers and methyl methacrylate monomers; and
            an initiator, wherein the initiator comprise a peroxide;
    introducing the fracturing fluid into a subterranean formation at or above a fracture gradient pressure to form a plurality of fractures therein;
    reacting the surfactant, the phase-change material, and the initiator within the subterranean formation, thereby forming a plurality of in situ proppant particulates, wherein heat naturally provided within the subterranean formation causes the reacting; and
    allowing at least a portion of the plurality of in situ proppant particulates to settle in the plurality of fractures.

2. The method of claim 1, wherein the phase-change material is present in the phase-transition fluid in an amount of from 10 wt % to 40 wt % of the phase-transition fluid.

3. The method of claim 1, wherein the surfactant is selected from the group consisting of an alkyl sulfate surfactant, an alkyl sulfonate surfactant, an alkylbenzene sulfonate surfactant, a polyether surfactant, and any combination thereof.

4. The method of claim 1, wherein the surfactant is present in the non-phase-transition fluid in an amount of from 0.1 wt % to 0.5 wt % of the non-phase-transition fluid.

5. The method of claim 1, wherein the initiator is selected from the group consisting of a diacyl peroxide, a ketone peroxide, a perester, a perketal, hydrogen peroxide, and any combination thereof.

6. The method of claim 1, wherein the initiator is present in the phase-transition fluid in an amount of from 0.01 wt % to 1 wt % of the phase-transition fluid.

7. The method of claim 1, wherein the phase-transition fluid further comprises a 2D-nanomaterial selected from the group consisting of graphene, graphene derivatives thereof, silicate clays, layered double hydroxides, transition metal dichalcogenides, transition metal oxides, black phosphorus, hexagonal boron nitride, antimonene, boron nanosheets, hexagonal boron nitride nanosheets, tin telluride nanosheets, and any combination thereof.

8. The method of claim 1, wherein the phase-transition fluid further comprises a 2D-nanomaterial present in the phase-transition fluid in an amount of from 0.01 wt % to 1 wt %.

9. A method comprising:
providing a fracturing fluid comprising:
a non-phase-transition fluid comprising at least an aqueous fluid and a surfactant, wherein the surfactant is selected from the group consisting of an alkyl sulfate surfactant, an alkyl sulfonate surfactant, an alkylbenzene sulfonate surfactant, a polyether surfactant, and any combination thereof; and
a phase-transition fluid comprising:
a phase-change material selected from the group consisting of styrene monomers, methyl methacrylate monomers, or a combination of styrene monomers and methyl methacrylate monomers;
an initiator; and
an accelerator;
introducing the fracturing fluid into a subterranean formation at or above a fracture gradient pressure to form a plurality of fractures therein;
reacting the surfactant, the phase-change material, the Initiator, and the accelerator within the subterranean formation, thereby forming a plurality of in situ proppant particulates; and
allowing at least a portion of the plurality of in situ proppant particulates to settle in the plurality of fractures.

10. The method of claim 9, wherein heat naturally provided within the subterranean formation further causes the reacting.

11. The method of claim 9, wherein the phase-change material is present in the phase-transition fluid in an amount of from 10 wt % to 40 wt % of the phase-transition fluid.

12. The method of claim 9, wherein the surfactant is present in the non-phase-transition fluid in an amount of from 0.1 wt % to 0.5 wt % of the non-phase-transition fluid.

13. The method of claim 9, wherein the initiator is selected from the group consisting of a diacyl peroxide, a ketone peroxide, a perester, a perketal, hydrogen peroxide, and any combination thereof.

14. The method of claim 9, wherein the initiator is present in the phase-transition fluid in an amount of from 0.01 wt % to 1 wt % of the phase-transition fluid.

15. The method of claim 9, wherein the accelerator is selected from the group consisting of dimethyl-p-toluidine, N,N-dimethylaniline, N,N-diethylaniline, N,N-bis-(2-hydroxyethyl)-m-toluidine, N,N-bis-(2-hydroxyethyl)-p-toluidine, and any combination thereof.

16. The method of claim 9, wherein the accelerator is present in the phase-transition fluid in an amount of from 0.01 wt % to 1 wt % of the phase-transition fluid.

17. The method of claim 9, wherein the phase-transition fluid further comprises a 2D-nanomaterial selected from the group consisting of graphene, graphene derivatives thereof, silicate clays, layered double hydroxides, transition metal dichalcogenides, transition metal oxides, black phosphorus, hexagonal boron nitride, antimonene, boron nanosheets, hexagonal boron nitride nanosheets, tin telluride nanosheets, and any combination thereof.

18. The method of claim 9, wherein the phase-transition fluid further comprises a 2D-nanomaterial present in the phase-transition fluid in an amount of from 0.01 wt % to 1 wt %.

19. A fracturing fluid comprising:
a non-phase-transition fluid comprising at least an aqueous fluid and a surfactant, wherein the surfactant is present in the non-phase-transition fluid in an amount of from 0.1 wt % to 0.5 wt % of the phase-transition fluid; and
a phase-transition fluid comprising:
a phase-change material selected from the group consisting of styrene monomers, methyl methacrylate monomers, or a combination of styrene monomers and methyl methacrylate monomers, the phase-change material present in the phase-transition fluid in an amount of from 10 wt % to 40 wt % of the phase-transition fluid;
an initiator present in the phase-transition fluid in an amount of from 0.01 wt % to 1 wt % of the phase-transition fluid, wherein the initiator comprises a peroxide; and
optionally, an accelerator present in the phase-transition fluid in an amount of from 0.01 wt % to 1 wt % of the phase-transition fluid.

* * * * *